May 20, 1969 N. J. CEDRONE 3,445,825

MAGNETICALLY BISTABILIZED MECHANICAL MEMORY DEVICE

Filed Nov. 26, 1965 Sheet 1 of 2

INVENTOR.
NICHOLAS J. CEDRONE
BY Kenway Jenney & Hildreth
Attorneys

INVENTOR.
NICHOLAS J. CEDRONE
BY Kenway, Jenney & Hildreth
attorneys

United States Patent Office 3,445,825

Patented May 20, 1969

3,445,825

MAGNETICALLY BISTABILIZED MECHANICAL MEMORY DEVICE

Nicholas J. Cedrone, Wayland, Mass. (% Daymarc Corporation, 191 High St., Waltham, Mass. 02154)

Filed Nov. 26, 1965, Ser. No. 509,932

Int. Cl. G11b 5/00, 5/30

U.S. Cl. 340—173 5 Claims

ABSTRACT OF THE DISCLOSURE

A bistable memory device having a pair of magnetic pole portions is shifted on a support between two positions wherein one or the other portion is in contact with a magnetic abutment. The memory device has permanent magnetic means establishing a magnetic field between the pole portions. The memory device has an actuating portion moved when the device is shifted through operation of input means.

The present invention relates generally to devices used in mechanisms for information storage or memory purposes, and more particularly to a bistable mechanical memory element, namely, one having two stable positions respectively designating two memory conditions.

Memory elements of this type are often employed in groups to increase the variety of information to be designated. Each element ordinarily requires separate input and output means. Each separate element in a group may be assigned to designate a unique bit of information, and if desired, the separate bits may be mutually exclusive with only one element in the group being actuated at any time. In more complex arrangements the elements may be actuated in various combinations, and the well-known limit of combinations equals the number 2 raised to a power equal to the number of elements in the group.

Many of the existing memory devices are of such form that they cannot be arranged compactly in groups, with the result that considerable space must be provided for the assembly. It is a principal object of this invention to provide a device that can be readily embodied in a compact assembly of individual memory elements, each element being of relatively small size and requiring only a small space for shifting between each of its two stable positions.

Another object of this invention is to provide a memory device in which each element can be shifted from one to the other of its stable positions with only a small amount of power applied through a suitable input device, yet in which the element is capable of delivering a substantially greater amount of power to a suitable output device. In this case the parts are preferably so arranged that the memory element is operable to complete a chain of linkages between a power source and the output device, the latter source being that which moves the memory element relatively to the output device.

Other objects of the invention include the provision of reliable, simple mechanical structures ruggedly constructed to insure dependable operation without critical adjustments. Also, the memory device should be of a type suitable for operating a variety of output devices, such as are found in a multitude of industrial applications. For example, the memory element may be employed to operate a mechanical linkage such as a lever, a slide or a switch actuator. It may also be used to operate a magnetic circuit, for example by interposing a magnetic element in an air gap. The memory element may also operate photocells, air jets or any other devices that may be operated by a mechanical movement or displacement of some sort.

With the foregoing and other objects in view, the features of this invention include a novel memory device having an element that is shiftable between two stable positions wherein one or the other of two magnetic pole portions thereof is brought into contact with an abutment. The memory element also has an actuating portion that interacts with the output means, depending upon he position to which the memory element is shifted.

Another feature is that the magnetic pole portions of the element form a closed magnetic loop that passes substantially through the abutment, whereby the element is stable when shifted to bring either of two poles, respectively located on opposite magnetic pole portions into contact with the abutment.

Other features of the invention reside in certain details of construction, arrangements of the parts and modes of operation that will be evident from the following description of a preferred embodiment, having reference to the appended drawings in which FIG. 1 is a plan view of an assembly of memory elements mounted for rotation relatively to a fixed input position;

Figure 3:
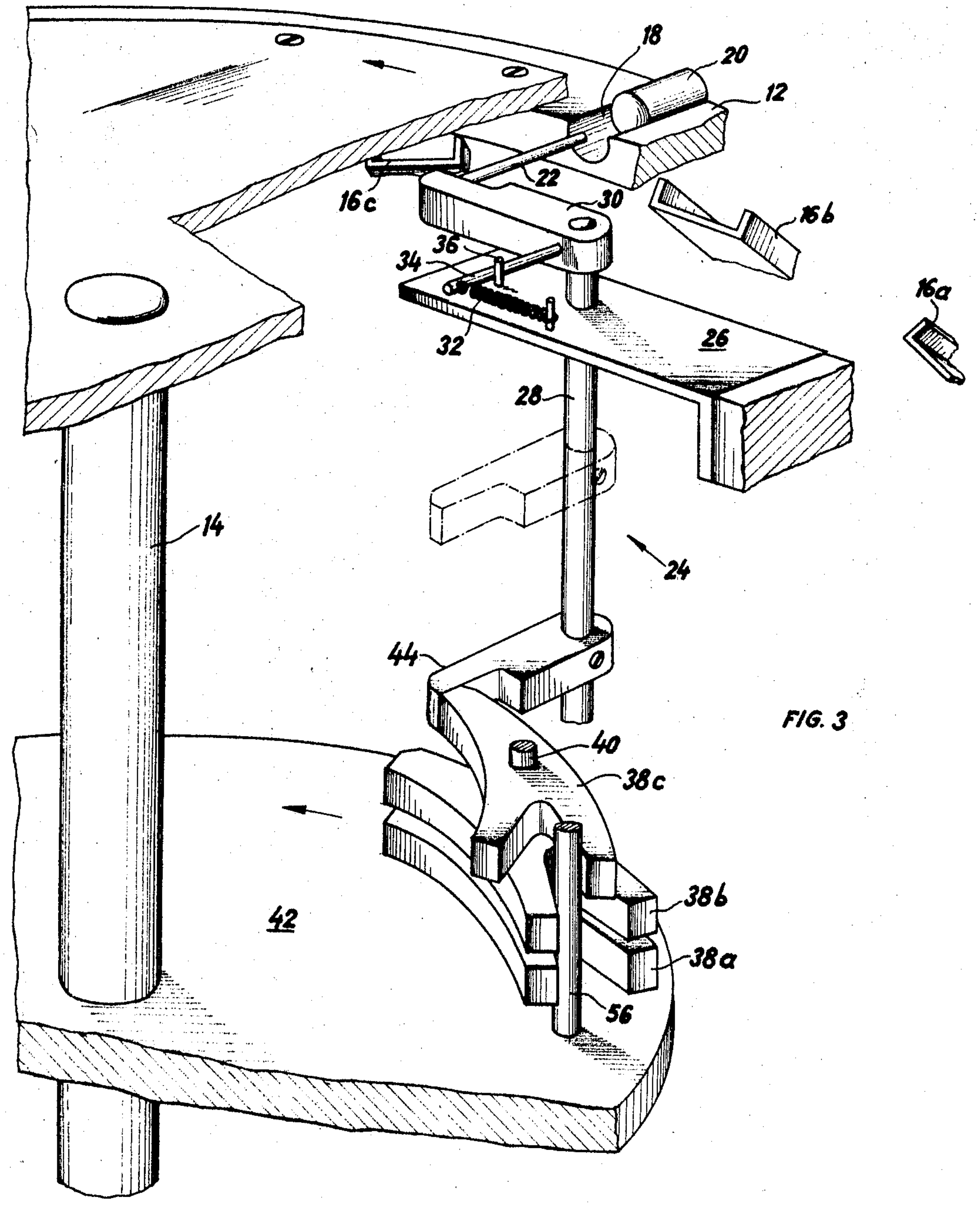
FIG. 3 is a view in perspective, partially broken away, illustrating one form of output device adapted for use in combination with the memory elements.

FIG. 3 illustrates one of a variety of possible industrial applications of the invention, used for purposes of illustration. A turret 12 rotates about the axis of a shaft 14 to which it is secured, and has suitable indexing means permitting it to advance in the direction of the arrows intermittently and successively to each of a number of fixed positions each having a delivery chute 16*a*, 16*b*, 16*c*, etc. The turret contains one or more slots 18 adapted to receive a product 20 to be delivered to a selected one of the chutes.

When the turret has been indexed to bring the product 20 to the selected chute such as the chute 16*b*, an ejector pin 22 forming part of an ejector mechanism is momentarily projected into the slot 18 and against the product to expel it from the turret. There is a separate ejector mechanism located adjacent each delivery chute. The ejector mechanism, generally designated at 24, is pivotally mounted on a fixed frame 26. A shaft 28 is pivotal on the frame and has an arm 30 fixed to its upper end, the arm 30 having the pin 22 projecting therefrom. A tension spring 32 is fastened at one end to the frame 26 and at the other end to a pin 34 projecting from the arm 30. Normally, the pin 34 rests against an abutment 36 on the frame with the ejector pin 22 withdrawn from the slot 18.

As the turret is turned, it carries a group of shiftable memory elements 38*a*, 38*b* and 38*c* stacked upon a pin 40, the pin 40 being supported upon a plate 42 integral with or forming a part of the turret 12. Each of these elements corresponds to one of the delivery positions and has two stable positions, namely, an unacuated position as represented by the elements 38*a* and 38*b*, and an actuated position as represented by the element 38*c*. A striker 44 is secured to the shaft 28 at a position thereon opposite to a particular memory element, whereby that element may rotate the striker to operate the ejector mechanism if the element is in the actuated position, but not if it is in the unactuated position.

It will be understood that there are a plurality of ejector mechanisms such as the mechanism 24 mounted about the turret, and these mechanisms differ from one another only in the position of the striker 44 along the pin 28 in relation to the stack of memory elements. Another possible position of the striker is illustrated in broken outline. In the illustrated device there are as many memory elements and corresponding striker positions as there are turret positions in which the product 20 can be selectively ejected.

Figure 1:
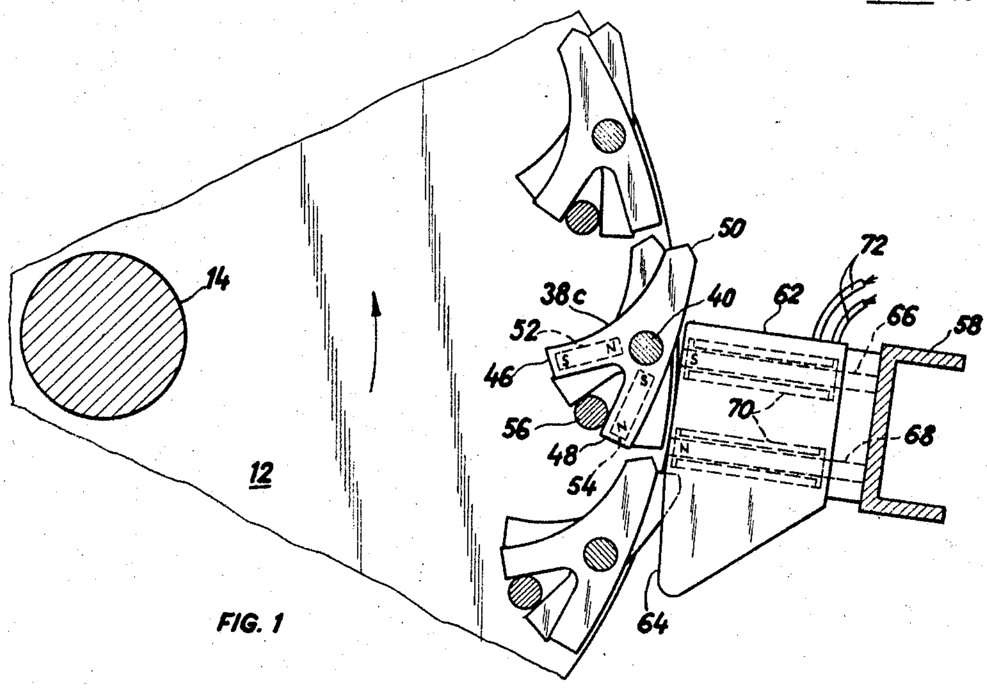
Figure 2:
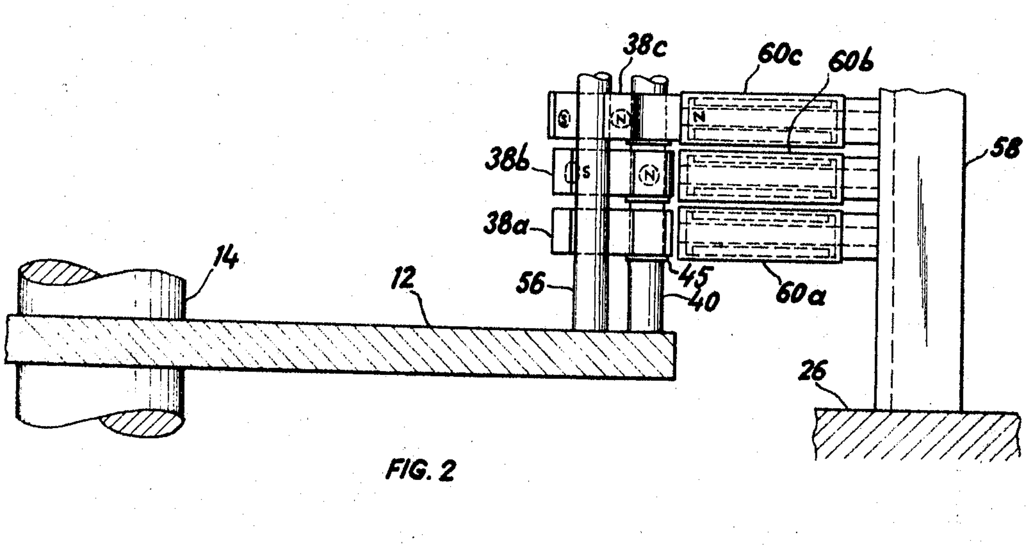
FIG. 2 is a side elevation partially in section, corresponding to FIG. 1.

FIGS. 1 and 2 show further details of the memory elements, and also illustrate a suitable input means having the dual function of resetting the elements and magnetically actuating them selectively. As shown in these drawings, there are preferably several groups of code elements distributed about the periphery of the turret 12. Each of the elements is preferably a generally Y-shaped cast plastic member having a cylindrical hole in its midsection to receive the pin 40 which is preferably a non-magnetic metal pin. The pin 40 preferably has spaced annular grooves to receive snap rings 45, whereby the elements are in closely spaced vertical relationship. The element has a pair of magnetic pole portions 46 and 48 and an actuating portion 50. The portions 46 and 48 contain permanent magnets 52 and 54, respectively, these magnets being cemented or otherwise fixed within hollow recesses in the portions 46 and 48.

Between the pole portions 46 and 48 there is mounted upon the turret 12 an abutment pin 56 which is preferably fabricated of a magnetic metal. As shown in the drawing, the magnets 52 and 54 have their poles oriented so as to form a single closed loop magnetic field passing substantially through the abutment pin 56. Thus the element has two stable positions, namely, an unactuated position in which the pin 56 is magnetically held against the magnetic pole portion 46, and an actuated position in which the pin 56 is magnetically held against the portion 48. In the unactuated position the element will not contact a striker 44 (FIG. 3) at any point about the periphery of the turret. In the actuated position, the actuating portion 50 of the shifted element follows a path interfering with a striker 44 at a selected one of the turret positions where the product 20 is to be ejected.

At a particular fixed position termed the "input position," there is provided a metal pedestal 58 mounted on the fixed support 26, the pedestal supporting a stack of electromagnets **60*a*, 60*b* and 60*c*, respectively aligned with the elements 38*a*, 38*b* and 38*c*. Each of these electromagnets preferably comprises a cast plastic body 62 having a curved plow portion 64 adapted to engage any element in the actuated position and to return it to the unactuated position as the turret rotates. A pair of metal pole pieces 66 and 68 are contained within the body 62, fastened to the pedestal 58 and provided with suitable windings 70 adapted for connection by means of wires 72 to a control circuit. Like poles of the electromagnet are opposed to the poles of the magnet 54 in the pole portion 48 of the memory element. Thus energization of the electromagnet when the elements are aligned as in FIG. 1 repels the magnet 54**, causing the element to reach the actuated position.

It will be apparent that other means may be employed for actuating the memory elements, such as mechanical devices adapted to push the memory element from one stable position to the other. Likewise, various other forms of output device may be readily adapted for use in conjunction with the illustrated memory elements. The illustrated output device has the advantage that an actuated element is capable of deliverying a substantial amount of torque to the striker 44, since the force of reaction of the striker tends to engage the element more firmly with the abutment pin 56, thereby setting up a linkage between the striker and the power source driving the turret. Typically, the turret may be driven by a relatively large motor having sufficient torque to overcome substantial resistance by the striker; yet very little energy is required to move any of the memory elements from the unactuated position to the actuated positon. This latter energy is only that required to repel the magnet 54 as described above.

It is also apparent that memory elements of this type can be mounted upon various forms of supports, the turret 12 being merely illustrative. Thus the memory elements may be mounted in fixed position and the input and output stations can be movable in relation thereto. Also, the elements could be mounted upon a chain structure, following a rectilinear path over a portion of its travel. Also, the products 20 to be distributed by the turret may be physically mounted, as illustrated, upon the same support that carries the stack of memory elements, or alternatively, the products 20 may be mounted on a support separate from that of the memory elements, with the supports being appropriately synchronized in their travel or step-wise advancement according to well-known techniques.

Also, it will be evident that the memory elements may be used for actuation of output devices that do not require mechanical contact, for example magnetic, electrostatic and photoelectric devices.

Other variations in the structure and applications of the invention will occur to those skilled in this art, and such adaptations are also believed to fall within the spirit and scope thereof.

Having thus described the invention, I claim:

1. A bistable memory device having, in combination,
a support,
an element pivotal about an axis in the support and having permanent magnet means to produce a magnetic field therein, a pair of arms defining an interviewing space and an actuating portion, each of the arms forming a pole of said magnetic field, said magnetic field forming a closed loop,
a magnetic abutment secured to the support, situated within said space and lying substantially within said field,
input means in movable relation to the support and adapted to pivot the element to shift the arms relatively to the abutment,
and output means movable in relation to the support and adapted for actuation by said actuating portion of the shifted element.

2. The combination according to claim 1, in which the input means include a magnet to repel one of the magnetic pole portions to shift the element.

3. The combination according to claim 1, in which the output means include a movable part in position to engage the actuating portion of the element if it is shifted to a first position, but not to engage the actuating portion of the element if it is shifted to a second position.

4. The combination according to claim 3, in which the abutment is in position to restrain the element in the first position when it is engaged by said movable part.

5. The combination according to claim 1, including drive means for moving the support relatively to the output means, the abutment being in position to apply to the element a reaction to the force exerted thereon by the movable part and thereby to transmit said force to the drive means.

References Cited

UNITED STATES PATENTS

| | | | |
|---|---|---|---|
| 3,103,824 | 9/1963 | Grumann | 74—568 X |
| 3,167,694 | 1/1965 | Bekedam | 335—207 X |
| 3,175,422 | 3/1965 | Braun | 335—205 X |
| 3,370,278 | 2/1968 | Hendrickx | 340—174 |

BERNARD KONICK, *Primary Examiner.*

J. F. BREIMAYER, *Assistant Examiner.*

U.S. Cl. X.R.

340—174; 335—207; 74—568